(12) United States Patent
Ahnert

(10) Patent No.: US 7,341,137 B2
(45) Date of Patent: Mar. 11, 2008

(54) CLUTCH ASSEMBLY

(75) Inventor: Gerd Ahnert, Sasbach (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 207 days.

(21) Appl. No.: 10/510,921

(22) PCT Filed: Apr. 10, 2003

(86) PCT No.: PCT/DE03/01176

§ 371 (c)(1),
(2), (4) Date: Apr. 15, 2005

(87) PCT Pub. No.: WO03/087607

PCT Pub. Date: Oct. 23, 2003

(65) Prior Publication Data

US 2005/0199467 A1    Sep. 15, 2005

(30) Foreign Application Priority Data

Apr. 10, 2002  (DE) ................................ 102 15 715
Oct. 2, 2002   (DE) ................................ 102 46 047

(51) Int. Cl.
 *F16D 13/48*   (2006.01)
 *F16D 27/00*   (2006.01)
 *F16D 13/75*   (2006.01)
(52) U.S. Cl. ............. 192/109 A; 192/84.6; 192/70.252
(58) Field of Classification Search .............. 192/52.6
   See application file for complete search history.

(56) References Cited

U.S. PATENT DOCUMENTS

| 5,632,365 A | * | 5/1997 | Maucher ................. 192/70.25 |
| 5,816,379 A |   | 10/1998 | De Briel et al. .......... 192/70.25 |
| 6,044,949 A |   | 4/2000 | Georg ...................... 192/70.25 |
| 6,269,926 B1 |  | 8/2001 | Lemoine et al. ........... 192/84.6 |
| 2002/0038749 A1 | * | 4/2002 | Reik et al. ................ 192/70.25 |

FOREIGN PATENT DOCUMENTS

| DE | 19736558 | 3/1999 |
| EP | 0867629 | 9/1998 |
| FR | 2739158 | 3/1997 |
| FR | 2768476 | 3/1999 |
| GB | 2 374 421 A | * 10/2002 |

\* cited by examiner

*Primary Examiner*—Rodney H. Bonck
(74) *Attorney, Agent, or Firm*—Davidson, Davidson & Kappel

(57) ABSTRACT

A clutch assembly in which a clutch, in order to engage, is pressed together against the force of the lining springiness via a lever plate. An additional spring force, which acts upon the lever plate in an opposite direction, alters the load placed on the clutch actuator whereby enabling it to be adapted to a linear compensating spring in an advantageous manner. The additional spring force is preferably applied by a disc spring, whereby the lever plate itself can be provided in the form of a lever disc spring. On the clutch actuator, a change in the direction of force can be prevented when the spring forces are appropriately matched.

12 Claims, 7 Drawing Sheets

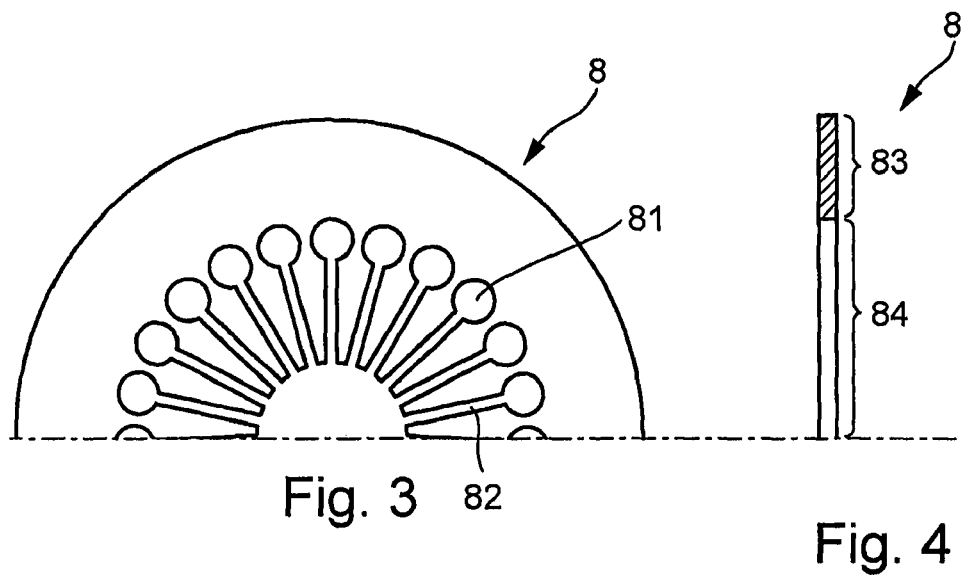
Fig. 3
Fig. 4
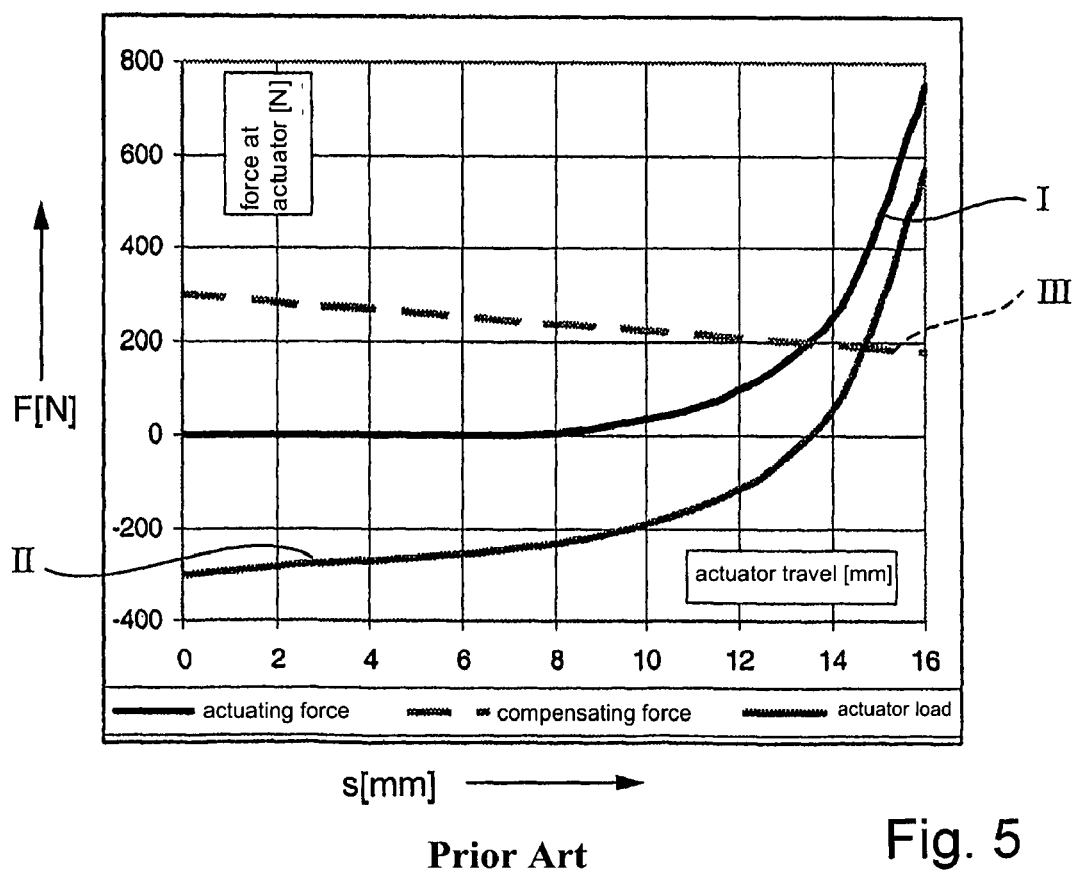
Prior Art
Fig. 5

CLUTCH ASSEMBLY

The present invention is directed to a clutch assembly having a clutch, to engage the clutch, a pressure plate being moved axially against the force of the lining springiness; having a lever plate, supported in the peripheral region, which transmits the force applied by a clutch-release system to a release bearing, to the pressure plate with leverage; and having a clutch actuator, whose actuating force, which is amplified by the force of a linear compensating spring, acts on the clutch-release system.

BACKGROUND

In the case of clutches used in motor vehicles, the clutch pedal can be eliminated when the clutch is driven by an actuator. This actuator can be electrical, hydraulic or pneumatic, an electromechanical clutch actuation being preferred.

When automatically operated clutch systems having a clutch actuator are used, it turns out to be beneficial to utilize the actuating force to engage the clutch. In this context, it has been shown that the force characteristic of a engaged clutch is essentially characterized by the characteristic of the lining springiness. When compensation is carried out by using a linear coil spring in the clutch actuator, the actuating force can only be divided approximately in half, a change in the direction of force being noted.

SUMMARY OF THE INVENTION

An object of the present invention is to provide a clutch assembly which will enable the clutch actuating force to be adapted to a linear compensating spring while entailing little expenditure.

This present invention provides a clutch assembly that includes a spring force which acts in the direction of the force of the lining springiness on the lever plate and whose magnitude is adapted to the magnitude of the force of the linear compensating spring.

The present invention is advantageous in that the loading of the clutch actuator is able to be varied by the action of an additional spring force and thus better adapted to a linear compensating spring. In this context, the lever system design of the closed clutch requires that the release bearing apply a greater load over the entire range of motion. This force-travel characteristic may then be advantageously compensated by the clutch actuator using a simple linear coil spring.

In accordance with one preferred embodiment of the present invention, in order to apply the spring force, the lever plate is designed as a lever diaphragm-spring system. Thus, no further constructional outlay is required for applying the spring force. Moreover, the force characteristic of a diaphragm spring is able to be adapted very effectively to the force characteristic of a linear compensating spring.

One preferred refinement of the present invention provides for the bearing surface of the pressure plate to be equipped with an adjusting ring to compensate for wear. Without compensating for wear in this manner, clutch-lining wear would alter the position of the lever plate and, respectively, of the lever diaphragm-spring system and thus change the force characteristics undesirably.

Another advantageous possibility for compensating for wear is provided by an adjusting ring that acts on the peripheral region of the lever plate. A cover stop is then preferably assigned to the radially inner region of the lever plate.

The combined action of an adjusting ring acting on the peripheral region of the lever plate and of a cover stop, leads, in response to actuation of the adjusting ring, to a changed lever plate position. Disadvantageous variations in the force characteristics are then preferably prevented by assigning an adjusting diaphragm spring to the lever plate to apply the spring force. An adjusting diaphragm spring of this kind may then be positioned in such a way that the spring force does not change in response to changes in the lever plate position.

In accordance with one first advantageous positioning possibility, the adjusting diaphragm spring is mounted on the outside of the lever plate. In this context, it is especially beneficial when the adjusting diaphragm spring is held in the peripheral region by a cover attachment and, in the radially inner region, by a lever-plate attachment.

In accordance with a second advantageous positioning possibility, the adjusting diaphragm spring is mounted on the inner side of the lever plate. In this context, it is especially beneficial when the adjusting diaphragm spring is held in the peripheral region by a cover attachment and rests in the radially inner region against the lever plate.

In one especially preferred embodiment of the present invention, the magnitude of the spring force acting on the lever plate is adapted to the magnitude of the force of the linear compensating spring in such a way that positive actuating forces are produced at the clutch actuator. It is beneficial in this context that only one direction of force occurs at the release bearing. This enables a conventional release bearing and a simple cap bearing to be used. Assembly and disassembly operations are thereby simplified. Moreover, advantages are derived for the clutch actuator design since only one direction of force is required at the lifting gear. This benefits the design of the transmission components and mounts and, under certain circumstances, may prevent actuator backlash.

In accordance with another embodiment of the present invention, the magnitude of the spring force acting on the lever plate is adapted to the magnitude of the force of the compensating spring in such a way that a large range of motion with minimal actuating forces results at the clutch actuator. In this case, to achieve minimal actuating forces, a change in the direction of the actuating forces is accepted.

BRIEF DESCRIPTION OF THE DRAWINGS

Other advantages and advantageous embodiments are derived from the dependent claims and from the drawings described in the following. Specifically shown in:

FIGS. 3 and 4 is the lever diaphragm-spring system of the clutch illustrated in FIG. 1 in a partial plan view and, respectively, in cross section;

FIG. 5 is a diagram of prior art showing the characteristic curve of the actuating force, compensating force and actuator load over the actuator travel for a conventional clutch assembly;

DETAILED DESCRIPTION

Figure 1:
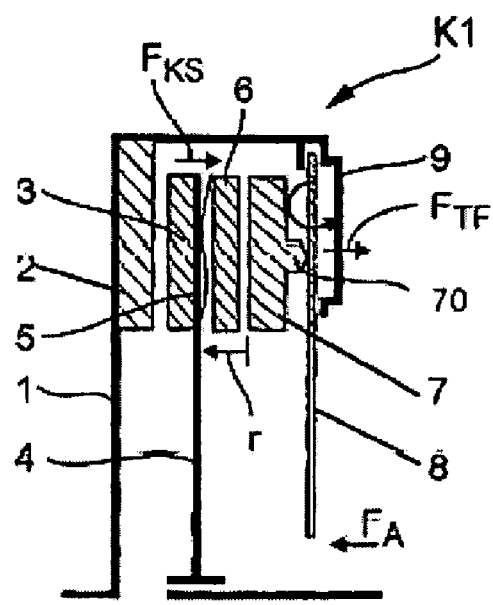
FIG. 1 is a first clutch having a lever spring-diaphragm system in a greatly simplified schematic representation.

In a greatly simplified schematic representation, FIG. 1 shows a section through the upper part of a clutch denoted, as a whole, by K1. Discernible, in succession, inside housing 1 of clutch K1 in a pulled-apart view are a flywheel 2, a first clutch lining 3, a clutch hub 4, a lining springiness indicated by a wavy line 5, a second clutch lining 6, a pressure plate 7 together with its bearing surface 70, and a lever plate 8. The cover of housing 1 which follows lever plate 8 is denoted by 9. Flywheel 2 is connected to the crankshaft (not shown in detail) of a driving engine, while clutch hub 4 is mounted on the input shaft (likewise not shown in detail) of the transmission. In response to engagement of the clutch, pressure plate 7 is shifted axially toward flywheel 2, until, in the engaged state, lining springiness 5 is compressed, and first clutch lining 3 is pressed against flywheel 2. The force of lining springiness 5 acting in the axial direction is indicated in FIG. 1 by an arrow and designated by $F_{KS}$, index $_{KS}$ providing an indication of the clutch disk. The pressure-plate travel during clutch engagement is likewise indicated in FIG. 1 by an arrow and denoted by r.

Figure 2:
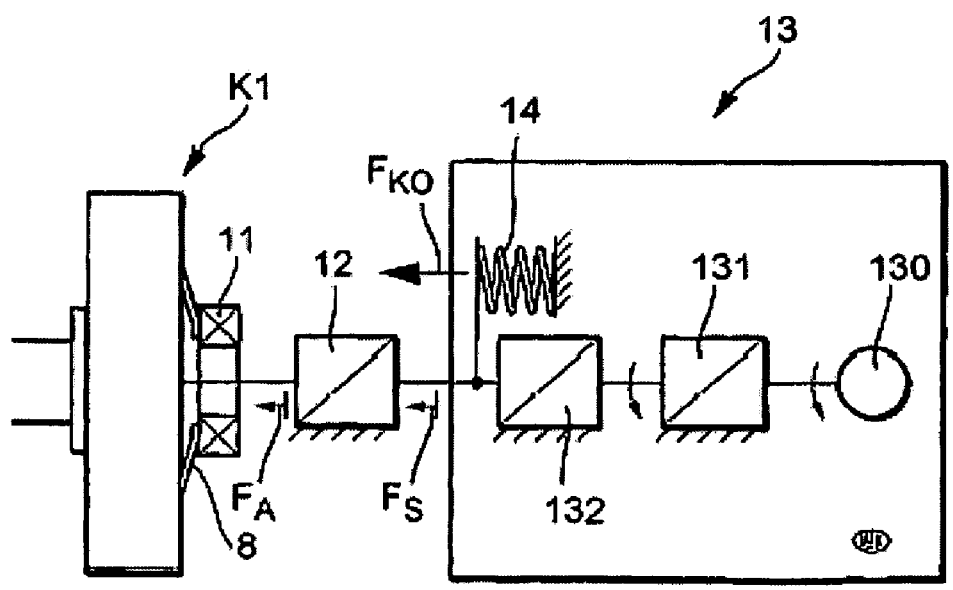
FIG. 2 is a clutch actuator having a subordinate clutch-release system for actuating the clutch illustrated in FIG. 1, in a greatly simplified schematic representation.

Clutch K1 is actuated by a clutch actuator, denoted as a whole by 13 in FIG. 2, in which are situated, in sequence, a servomotor 130, an intermediate gear 131 and a lifting gear 132. Lifting gear 132 is, for example, a spindle drive. Also belonging to clutch actuator 13 is a linear compensating spring 14, whose spring force is indicated by an arrow and is denoted by $F_{KO}$. This spring force $F_{KO}$ of linear compensating spring 14 amplifies the actuating force produced by lifting gear 132, the resulting actuating force being indicated by an arrow and denoted by $F_S$ in FIG. 2.

It is discernible that actuating force $F_S$ is transmitted via a clutch-release system 12, which, for example, is a so-called central release mechanism, to a release bearing 11, the force acting on release bearing 11 in FIG. 2 being indicated by an arrow and denoted by $F_A$. It is also discernible that release bearing 11, for its part, acts on the central area of lever plate 8, which, in FIG. 2, in order to clarify this operation, projects slightly out of clutch K1, which is merely shown schematically.

In FIG. 1, the action of release bearing 11 on lever plate 8 is indicated by an arrow $F_A$ running in the axial direction. Lever plate 8, which is supported in the peripheral region in a circumferential groove (not shown in detail) of housing 1, transmits force $F_A$ with leverage to bearing surface 70 of pressure plate 7. On the other hand, lever plate 8, which is shown in greater detail in FIGS. 3 and 4, is designed as a lever diaphragm-spring system, which is installed in the preloaded state in clutch K1, this preloading being indicated in FIG. 1 by a curved arrow (not more closely designated). In accordance with FIG. 3, lever plate 8 is provided with a multiplicity of holes 81 and radial slots 82, so that they may also be regarded as a sum of radially aligned, one-armed levers which are disposed side-by-side in the circumferential direction. In the cross section in accordance with FIG. 4, the effective diaphragm spring region of lever plate 8 is denoted by 83, while the pure lever region is denoted by 84.

In FIG. 1, the spring force produced by the spring properties of lever plate 8 is indicated by an arrow and denoted by $F_{TF}$. It is discernible that spring force $F_{TF}$ acts at the level of bearing surface 70 of pressure plate 7 in the same direction as force $F_{KS}$ of lining springiness 5. Thus, the effect of spring force $F_{TF}$ of lever plate 8 designed as a lever diaphragm-spring system is that release bearing 11 (compare FIG. 2) must apply a greater load over the entire range of motion. Thus, between force $F_{KS}$ of lining springiness 5 of spring force $F_{TF}$ of lever plate 8 and force $F_A$ acting on release bearing 11 (compare FIG. 2), the following relationship is derived $$O = F_{KS} + F_{TF} - i \cdot F_A,$$

the lever ratio determined by the dimensions of lever plate 8 being denoted by i.

Figure 6:
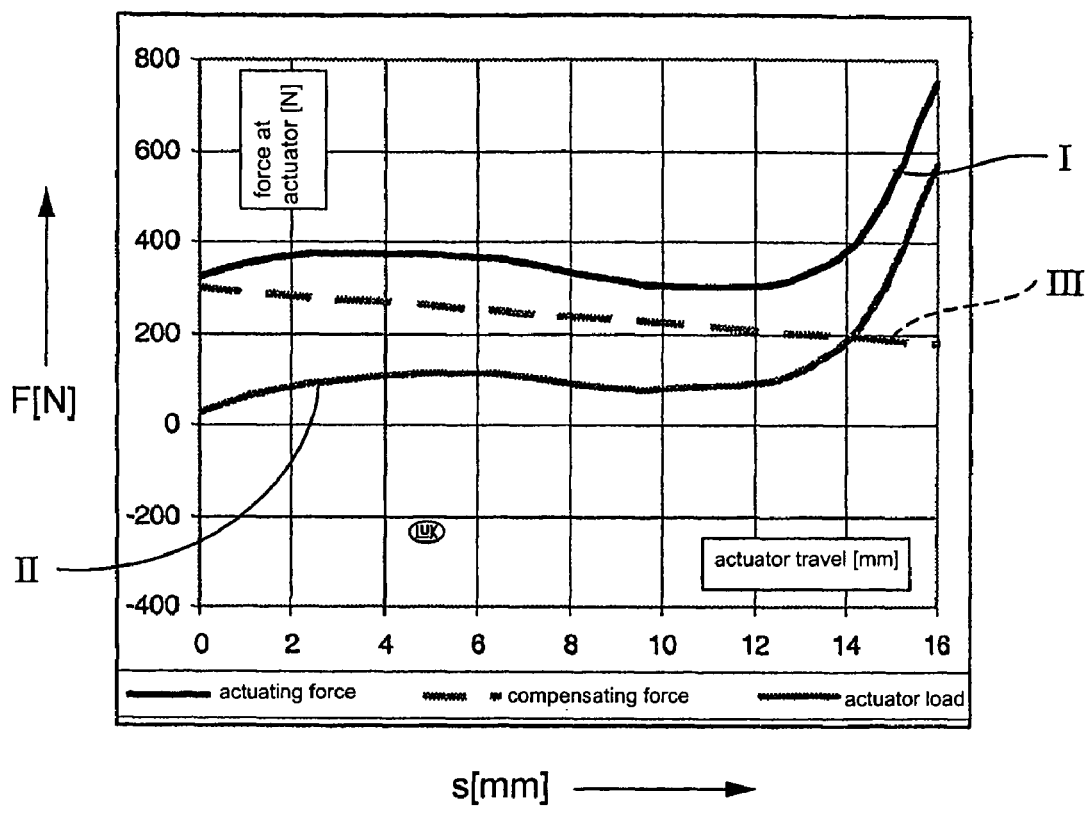
FIG. 6 is a diagram showing the characteristic curve of the actuating force, compensating force and actuator load over the actuator travel for a clutch assembly according to the present invention.

Spring force $F_{TF}$ applied by the diaphragm spring action of lever plate 8 is adapted to force $F_{KO}$ of compensating spring 14 (compare FIG. 2), this adaptation being clarified with reference to the diagrams illustrated in FIGS. 5 and 6. In these two diagrams, the characteristic curve of the actuating force denoted by I, the characteristic curve of the actuator load denoted by II, and the characteristic curve of the compensating force, designated by III and shown as a broken line, are plotted over actuator travel s, forces F being indicated in N, and actuator travel s being indicated in mm.

The diagram in accordance with FIG. 5 shows the influences of a linear compensating spring in a conventional clutch assembly, namely how it effects a change in the direction of force in the characteristic curve of actuator load II. In contrast, the diagram in accordance with FIG. 6, given a same compensation, shows a changed characteristic curve of actuating force I and of actuator load II, this change being caused by spring force $F_{TF}$ of lever plate 8 designed as a lever diaphragm-spring system (compare FIG. 1). The greater actuating forces produced by spring force $F_{TF}$ are adapted to the compensating forces in such a way that no change in the action of force is to be noted in the entire characteristic curve II of the actuating force. Thus, the adaptation of spring force $F_{TF}$ (compare FIG. 1) to force $F_{KO}$ of linear compensating spring 14 effects positive actuating forces $F_S$ of clutch actuator 13 (compare FIG. 2). As can be seen, the curves I and III shift upward in FIG. 6 with respect to FIG. 5 so that curve I has a similar order of magnitude of the force of the linear compensating spring.

Clutch-lining wear would alter the position of the lever diaphragm-spring system. The consequence would be a rapid change in the force characteristics. The measures proposed in FIGS. 7 through 11 indicate various approaches for overcoming this problem.

Figure 7:
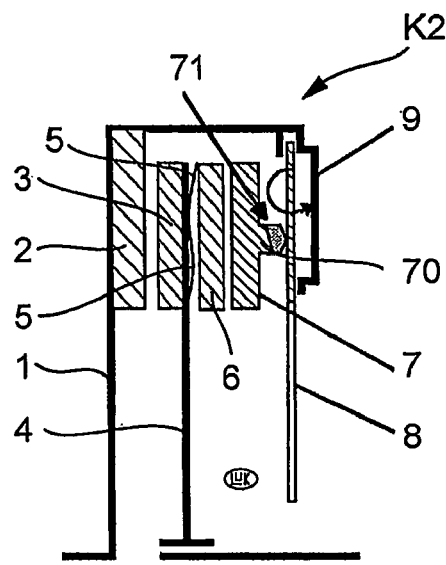
FIG. 7 is a second clutch having a lever spring-diaphragm system and compensation for wear at the pressure plate, in a greatly simplified schematic representation.

Clutch K2 depicted in FIG. 7 substantially corresponds to clutch K1 in accordance with FIG. 1. Here, however, bearing surface 70 of pressure plate 7 is equipped with an adjusting ring 71 for compensating for wear. This adjusting ring 71 is designed as a ramp ring, which moves to the right when rotated axially and is thus able to compensate for wear on clutch linings 3 and 6. Thus, by compensating for wear with the aid of adjusting ring 71, it is possible to avoid any change in the position of lever plate 8 designed as a lever diaphragm-spring system, i.e., any change in the force characteristics is avoided.

Figure 8:
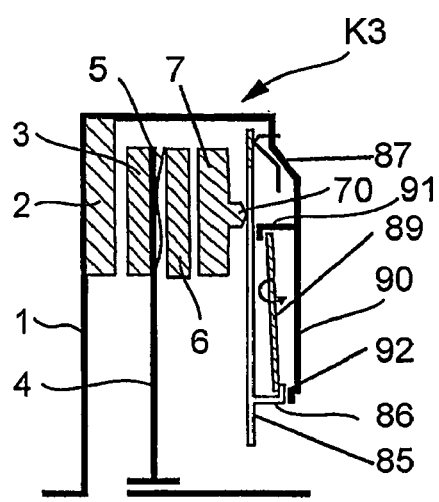
FIGS. 8 and 9 is a third clutch having a lever plate and an adjusting diaphragm spring on the outside of the lever plate, in a new condition and, respectively, after compensating for wear.
Figure 9:
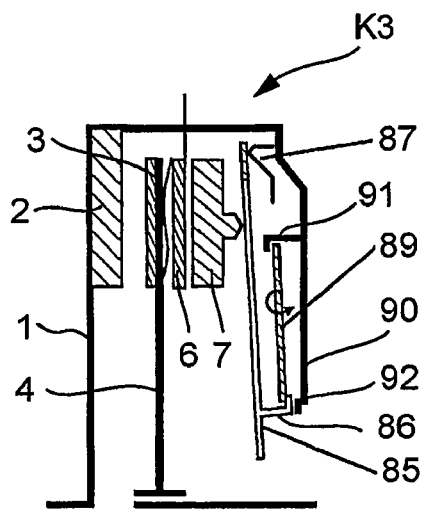

FIGS. 8 and 9 show a clutch K3 which corresponds substantially to clutch K1 in accordance with FIG. 1. However, the lever plate denoted here by 85 does not feature any spring characteristics or, at most, only negligible spring characteristics, so that spring force $F_{TF}$ (compare FIG. 1) must be applied by an adjusting diaphragm spring 89. This adjusting diaphragm spring 89, whose spring action is indicated by a curved arrow (not shown in greater detail), is located on the outside of lever plate 85. Adjusting diaphragm spring 89 is held in the peripheral region by an attachment 91 of the cover denoted here by 90, while the radially inner region is held by an attachment 86 of lever plate 85. To compensate for wear, an adjusting ring 87, which acts on the peripheral region of lever plate 85, is provided on cover 90. Adjusting ring 87 is a ramp ring that is customary in clutch manufacture. A cover stop 92, which limits the motion of lever plate 85 during the adjustment, is assigned to adjusting ring 87.

FIG. 8 shows clutch K3 in a new condition, while FIG. 9 shows clutch K3 after clutch linings 3 and 6 have been subject to wear and adjusting ring 87 has been actuated accordingly. It is discernible that the position of lever plate 85 changes perceptibly in response to actuation of adjusting ring 87 and, however, that the position of adjusting diaphragm spring 89 remains the same. Thus, in clutch K3, a compensation for wear does not lead to any change in the force characteristics.

Figure 10:
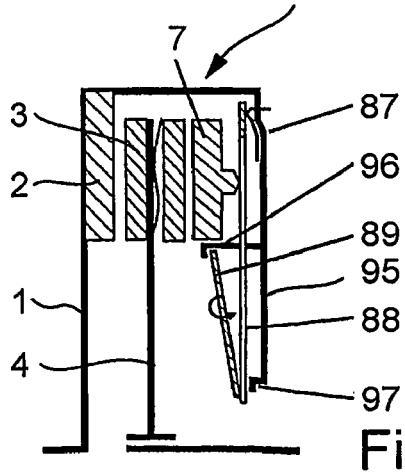
FIGS. 10 and 11 is a fourth clutch having a lever plate and an adjusting diaphragm spring on the inner side of the lever plate, in a new condition and, respectively, after compensating for wear.
Figure 11:
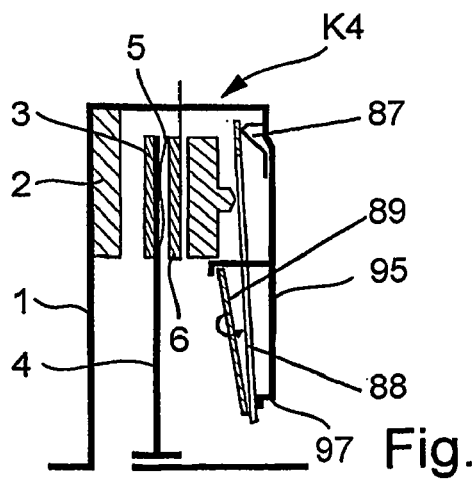

FIGS. 10 and 11 show a clutch K4 which corresponds substantially to clutch K1 in accordance with FIG. 1. However, lever plate denoted here by 88 does not feature any spring characteristics or, at most, only negligible spring characteristics, so that, here as well, spring force $F_{TF}$ (compare FIG. 1) must be applied by an adjusting diaphragm spring 89. This adjusting diaphragm spring 89, whose spring action is indicated by a curved arrow (not shown in greater detail), is located on the inner side of lever plate 88. Adjusting diaphragm spring 89 is held in the peripheral region by an attachment 96 of the cover denoted here by 95, while the radially inner region rests against lever plate 88. Cover attachment 96 is subdivided in the circumferential direction into segments, the individual segments passing through corresponding cut-outs in lever plate 88. Here as well, to compensate for wear, an adjusting ring 87, which acts on the peripheral region of lever plate 88, is provided on cover 95. A cover stop 97, which limits the motion of lever plate 88 during the adjustment, is assigned to adjusting ring 87.

FIG. 10 shows clutch K4 in a new condition, while FIG. 11 shows clutch K4 after clutch linings 3 and 6 have been subject to wear and adjusting ring 87 has been actuated accordingly. It is discernible that the position of lever plate 88 changes perceptibly in response to actuation of adjusting ring 87 and, however, that the position of adjusting diaphragm spring 89 remains the same. Thus, in clutch K4, a compensation for wear does not lead to any change in the force characteristics.

In clutches K1, K2, K3 and K4 clarified with reference to FIGS. 1, 7, 8 and 9, as well as 10 and 11, the greater clutch-release forces produced by additional spring force $F_{TF}$ (compare FIG. 1) may be reinforced by a clutch-release system that is fixed to the cover. This makes it possible to avoid greater loading of the crankshaft bearing.

On the basis of diagrams, FIGS. 12 through 17 show how the properties of the actuator loading are able to be influenced by tuning the force characteristics of the lining springiness, the lever diaphragm-spring system, and of the compensating spring. In the diagrams in accordance with FIGS. 12, 14 and 16, the chracteristic curve of the force of the lining springiness denoted by IV, the characteristic curve of the force of the lever diaphragm-spring system denoted by V, and the characteristic curve of the actuating force denoted by VI are plotted, respectively, over pressure-plate travel r (compare FIG. 1), forces F being indicated in N, and the pressure-plate travel being indicated in millimeters. In the diagrams in accordance with FIGS. 13, 15 and 17, the characteristic curve of the actuating force denoted by I, the characteristic curve of the actuator load denoted by II, and the characteristic curve of the compensating force denoted by III are plotted, respectively, over actuator travel s, forces F being indicated in N, and actuator travel being indicated in millimeters.

Figure 12:
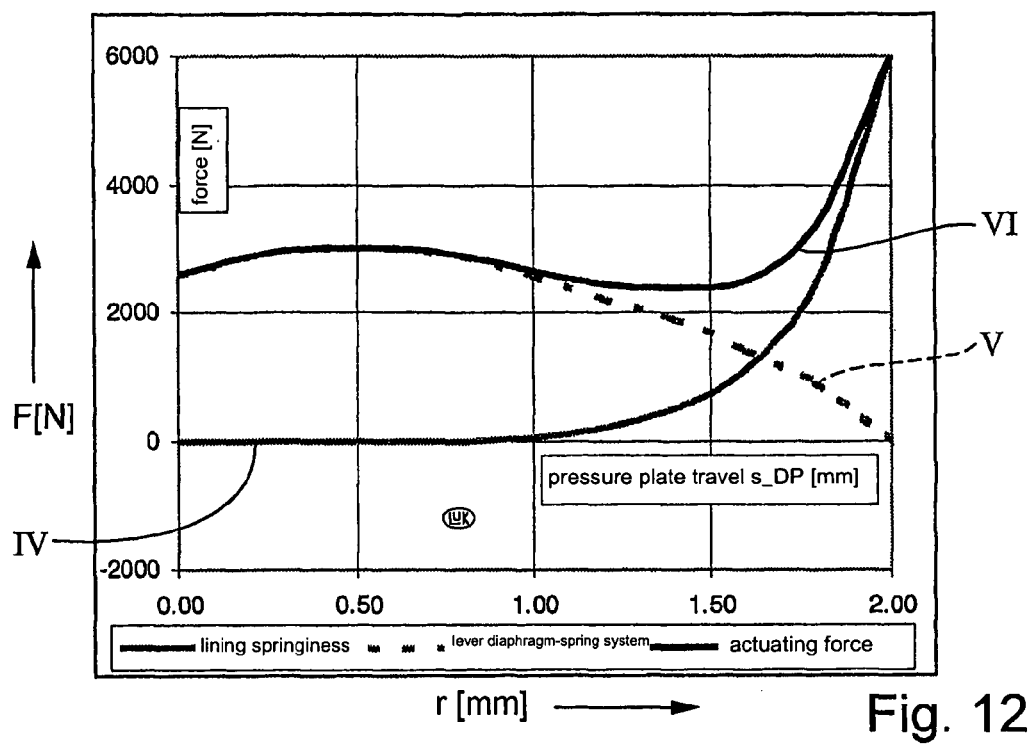
FIGS. 12 through 17 are diagrams clarifying how the properties of the actuator loading are able to be influenced by tuning the force characteristics of the lining springiness, the lever diaphragm-spring system, and of the compensating spring in the clutch actuator.
Figure 13:
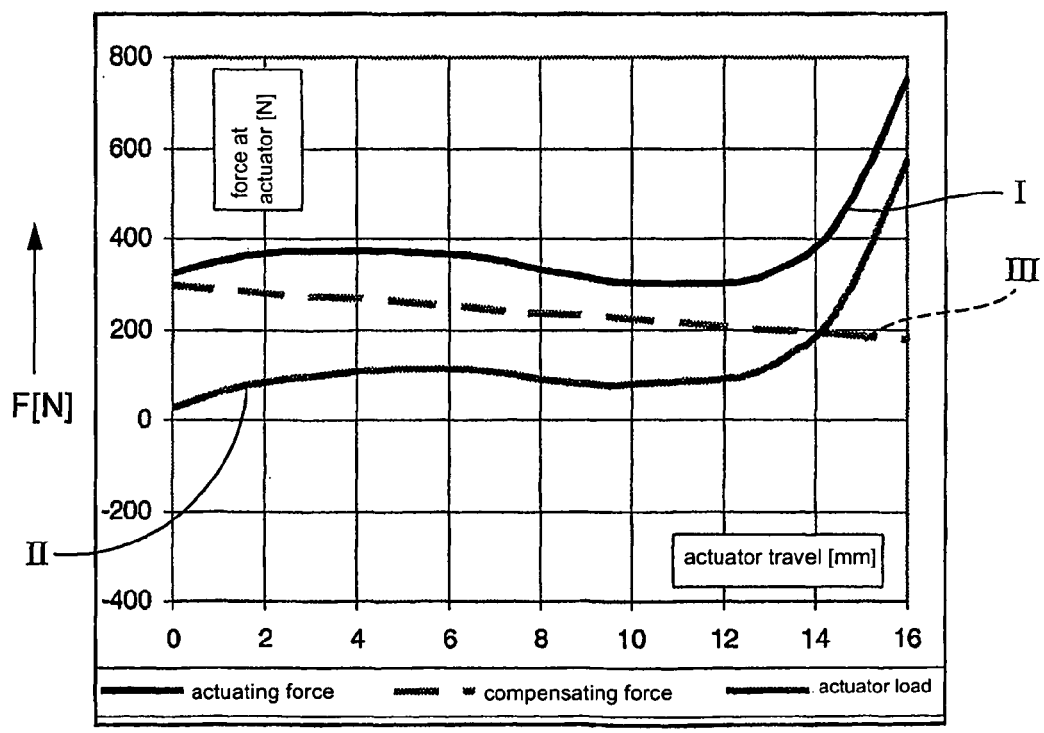

The diagrams illustrated in FIGS. 12 and 13 show that a relatively high spring force $F_{TF}$ of lever plate 8 designed as a lever spring-diaphragm system (compare FIG. 1) and spring force $F_{KO}$ of compensating spring 14 (compare FIG. 2) produce positive actuating forces $F_S$ at clutch actuator 13.

Figure 15:
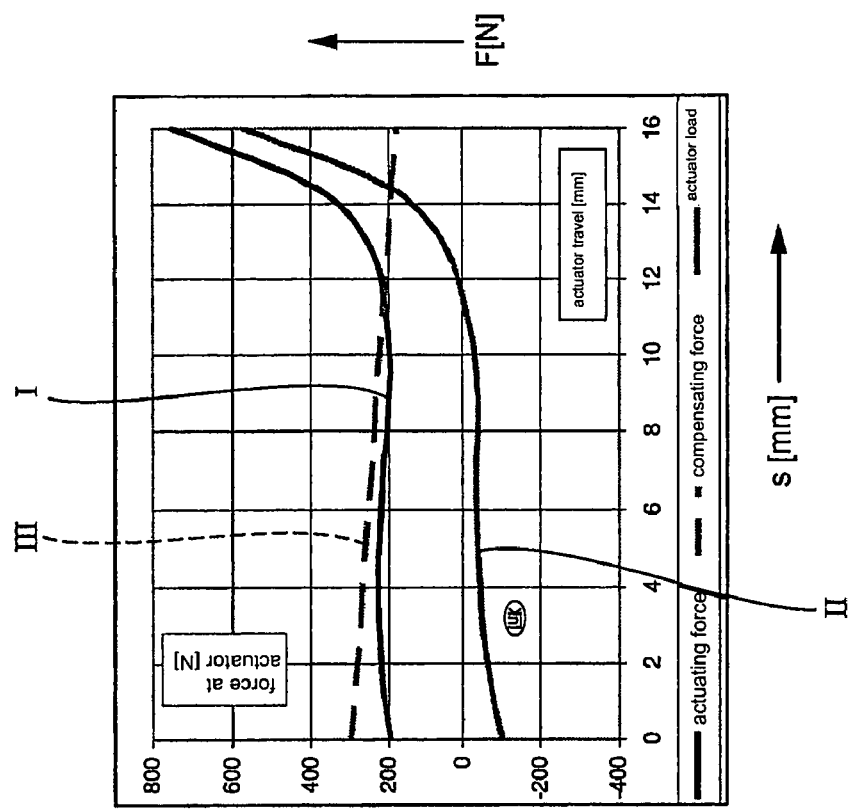
Figure 14:
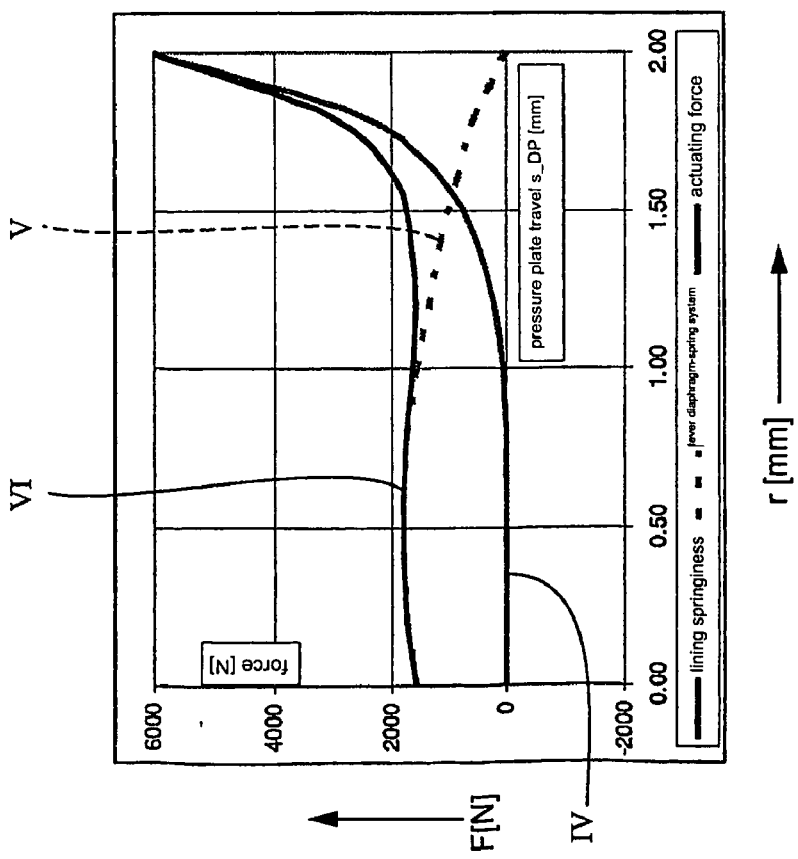

The diagrams depicted in FIGS. 14 and 15 show that, given an equivalent spring force $F_{KO}$ of compensating spring 14, a reduced spring force $F_{TF}$ effects a change in the direction of actuating force $F_S$.

Figures 16, 17:
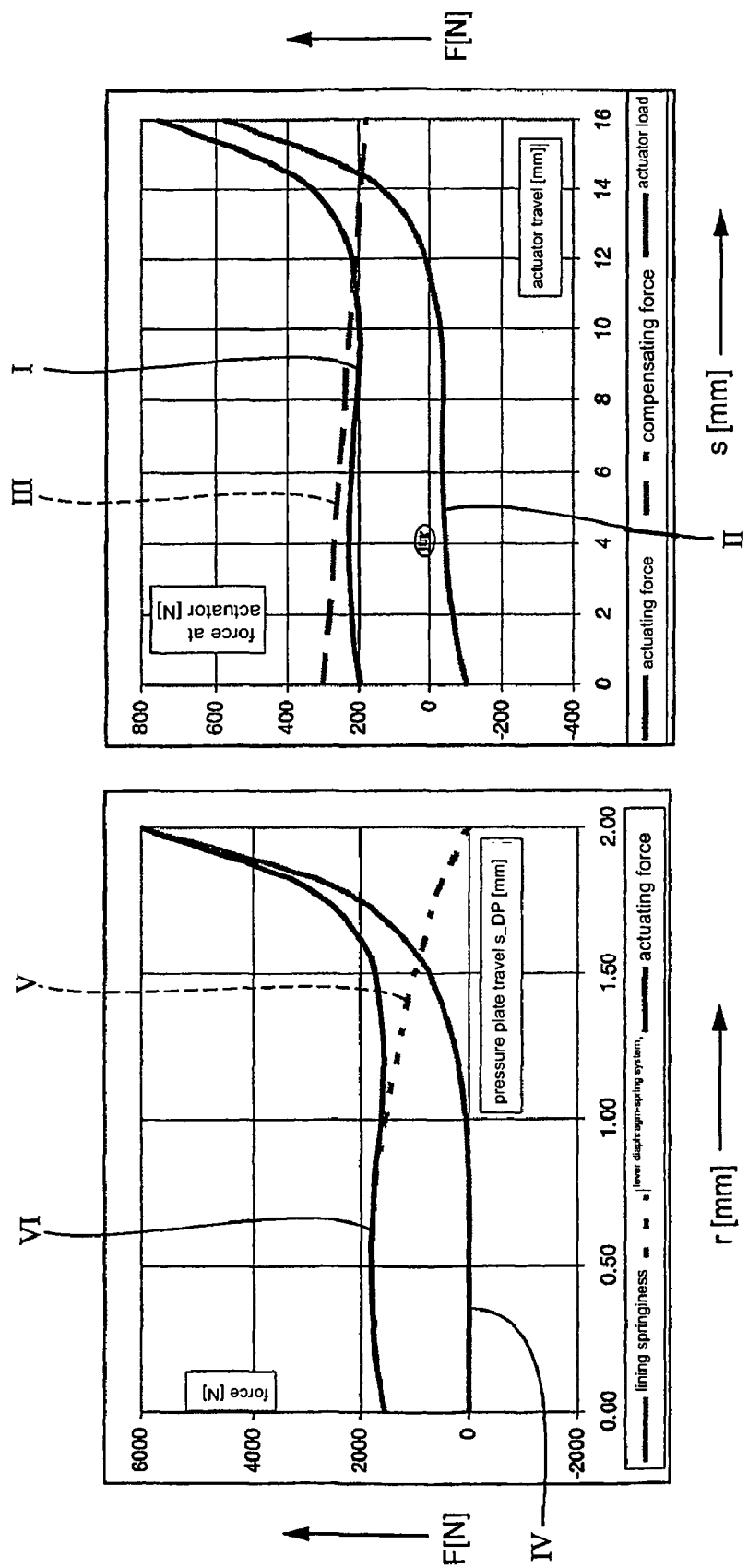

The diagrams illustrated in FIGS. 16 and 17 show that a relatively high spring force $F_{TF}$ and a higher spring force $F_{KO}$ of a more powerful compensating spring 14 effect a large range of motion with minimized actuating forces $F_S$ at clutch actuator 13.

The relationships illustrated in FIGS. 12 through 17 for clutch K1 (compare FIG. 1) are also applicable to clutches K2, K3 and K4 in accordance with FIGS. 7, 8 and 9, as well as 10 and 11.

The claims filed with the application are proposed formulations and do not prejudice the attainment of further patent protection. The applicant reserves the right to claim still other combinations of features that, so far, have only been disclosed in the specification and/or the drawings.

The antecedents used in the dependent claims refer, by the features of the respective dependent claim, to a further embodiment of the subject matter of the main claim; they are not to be understood as renouncing attainment of an independent protection of subject matter for the combinations of features of the dependent claims having the main claim as antecedent reference.

Since, in view of the related art on the priority date, the subject matters of the dependent claims may form separate and independent inventions, the applicant reserves the right to make them the subject matter of independent claims or of divisional applications. In addition, they may also include independent inventions, whose creation is independent of the subject matters of the preceding dependent claims.

The exemplary embodiments are not to be understood as limiting the scope of the invention. Rather, within the framework of the present disclosure, numerous revisions and modifications are possible, in particular such variants, elements and combinations and/or materials, which, for example, by combining or altering individual features or elements or method steps described in connection with the general description and specific embodiments, as well as the claims, and contained in the drawings, may be inferred by one skilled in the art with regard to achieving the objective, and lead, through combinable features, to a new subject matter or to new method steps or sequences of method steps, also to the extent that they relate to manufacturing, testing, and operating methods.

What is claimed is:

1. A clutch assembly comprising:
a clutch including a clutch lining having a springiness;
a pressure plate configured to engage the clutch, the pressure plate being axially moveable against a force of the springiness of the lining;
a clutch-release system;
a release bearing;
a lever plate supported in a peripheral region and transmitting with leverage a release force to the pressure plate, the release force being applied by the clutch-release system to the release bearing; and
a clutch actuator having a linear compensating spring and exerting an actuating force on the release bearing, the actuating force being amplified by a force of the linear compensating spring,
wherein a spring force acts on the lever plate in a direction of the force of the springiness of the lining, the spring force being within an order of magnitude of the force of the linear compensating spring.

2. The clutch assembly as recited in claim 1, wherein the lever plate includes a lever diaphragm-spring system.

3. The clutch assembly as recited in claim 1, wherein a bearing surface of the pressure plate includes an adjusting ring configured to compensate for wear.

4. The clutch assembly as recited in claim 1, further comprising an adjusting ring acting on the peripheral region of the lever plate and configured to compensate for wear.

5. The clutch assembly as recited in claim 4, further comprising a cover stop assigned to a radially inner region of the lever plate.

6. The clutch assembly as recited in claim 1, further comprising an adjusting diaphragm spring assigned to the lever plate for applying the spring force.

7. The clutch assembly as recited in claim 6, wherein the adjusting diaphragm spring is disposed on an outer side of the lever plate.

8. The clutch assembly as recited in claim 7, further comprising a cover attachment holding a peripheral region of the adjusting diaphragm spring and a lever-plate attachment holding a radially inner region of the adjusting diaphragm spring.

9. The clutch assembly as recited in claim 6, wherein the adjusting diaphragm spring is disposed on an inner side of the lever plate.

10. The clutch assembly as recited in claim 9, further comprising a cover attachment holding a peripheral region of the adjusting diaphragm spring and wherein a radially inner region of the adjusting diaphragm spring rests against the lever plate.

11. The clutch assembly as recited in claim 1, wherein the magnitude of the spring force acting on the lever plate is adapted to the magnitude of the force of the linear compensating spring in such a manner as to result in the actuating force being positive at the clutch actuator.

12. The clutch assembly as recited in claim 1, wherein the magnitude of the spring force acting on the lever plate is adapted to the magnitude of the force of the linear compensating spring in such a manner so as to enable a large range of motion with minimal actuating force at the clutch actuator.

* * * * *